(12) United States Patent
Chinniah et al.

(10) Patent No.: US 7,837,349 B2
(45) Date of Patent: Nov. 23, 2010

(54) NEAR FIELD LENS

(75) Inventors: Jeyachandrabose Chinniah, Belleville, MI (US); Edwin Mitchell Sayers, Saline, MI (US); Christopher L. Eichelberger, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 690 days.

(21) Appl. No.: 11/763,884

(22) Filed: Jun. 15, 2007

(65) Prior Publication Data

US 2008/0310159 A1 Dec. 18, 2008

(51) Int. Cl.
*F21V 5/00* (2006.01)
*G02B 13/20* (2006.01)
*G02B 3/10* (2006.01)

(52) U.S. Cl. ............... 362/244; 362/246; 362/237; 359/641; 359/642; 359/707; 359/721; 359/724

(58) Field of Classification Search ......... 359/641, 359/707, 708, 721, 724, 726–732, 741–743, 359/619, 625, 626, 620; 362/237, 244, 246, 362/236, 226, 261
See application file for complete search history.

(56) References Cited

U.S. PATENT DOCUMENTS

| | | | | |
|---|---|---|---|---|
| 4,329,047 A | * | 5/1982 | Kikuchi et al. ............... 356/28 |
| 5,319,496 A | * | 6/1994 | Jewell et al. ................. 359/741 |
| 5,924,788 A | | 7/1999 | Parkyn, Jr. |
| 6,547,423 B2 | * | 4/2003 | Marshall et al. ............. 362/333 |
| 6,724,543 B1 | * | 4/2004 | Chinniah et al. ............ 359/718 |
| 6,819,505 B1 | | 11/2004 | Cassarly et al. |
| 7,160,522 B2 | * | 1/2007 | Minano Dominguez et al. . 422/186.3 |
| 7,168,839 B2 | * | 1/2007 | Chinniah et al. ............ 362/555 |
| 7,461,960 B2 | * | 12/2008 | Opolka et al. ............... 362/545 |
| 7,548,670 B2 | * | 6/2009 | Ijzerman et al. .............. 385/33 |
| 7,580,192 B1 | * | 8/2009 | Chu et al. .................... 359/641 |
| 2004/0080835 A1 | * | 4/2004 | Chinniah et al. ............ 359/708 |
| 2005/0152153 A1 | | 7/2005 | Amano |
| 2006/0203353 A1 | | 9/2006 | Park et al. |
| 2006/0238881 A1 | | 10/2006 | Park et al. |
| 2007/0109791 A1 | * | 5/2007 | Chinniah et al. ............ 362/334 |

\* cited by examiner

*Primary Examiner*—Sandra L O'Shea
*Assistant Examiner*—Danielle Allen
(74) *Attorney, Agent, or Firm*—Brinks Hofer Gilson & Lione

(57) ABSTRACT

A lens has a main body for use with at least one light source. The main body has a light-emitting face, a light-collecting face disposed opposite the light-emitting face, and a plurality of focal points, the latter of which form a focal ring. A central axis extends through the light-collecting face and the light-emitting face. The main body is substantially radially symmetrical about the central axis and the focal ring extends around the central axis of the main body of the lens.

19 Claims, 5 Drawing Sheets

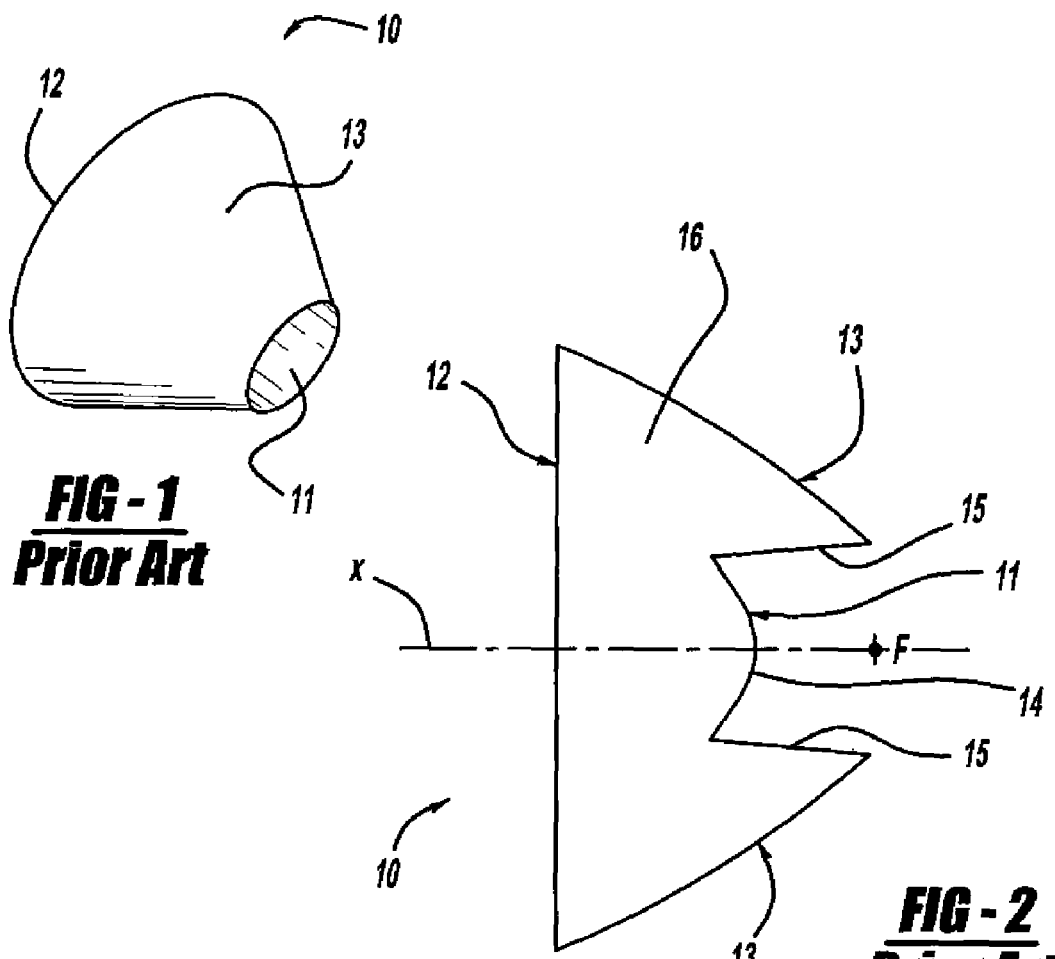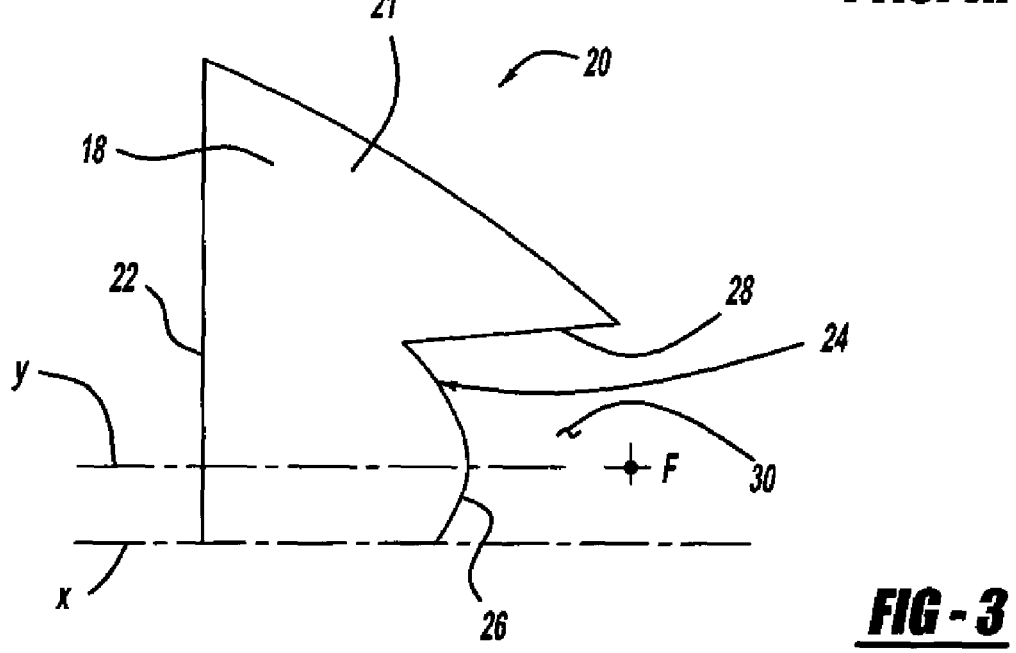

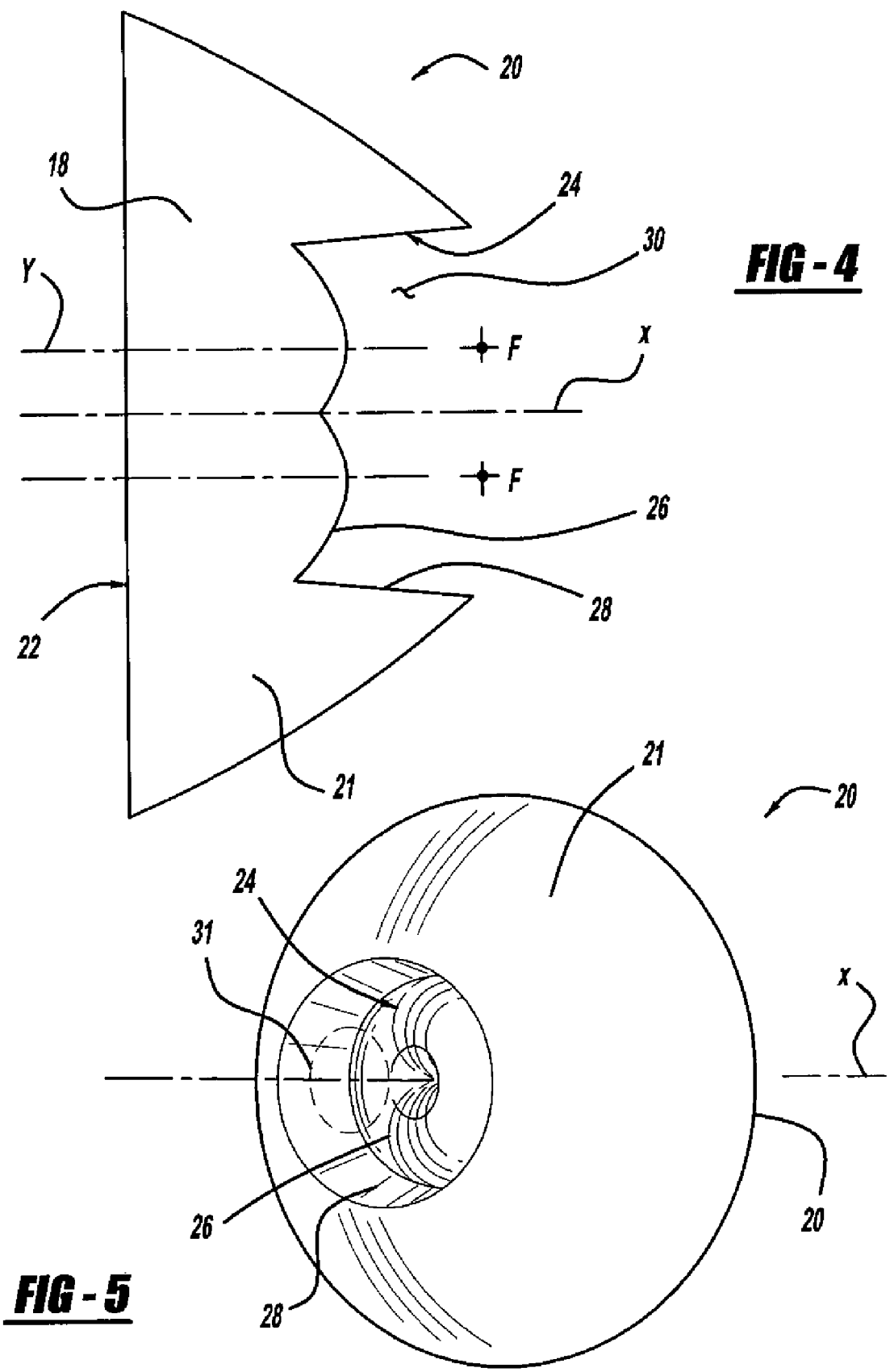

NEAR FIELD LENS

FIELD OF THE INVENTION

The present invention generally relates to lighting systems. More particularly, the present invention relates to lighting systems that employ lenses to collect light from a light source and direct the light within the lighting system.

DESCRIPTION OF RELATED ART

In automotive vehicle lighting applications, a single light-emitting diode (LED) does not provide enough light intensity to meet the light intensity requirements of the application. Therefore, multiple LEDs are used. A plurality of low-powered LEDs, ten or more for example, each with its own dedicated reflector or lens optics, are used in many automotive lighting applications. Each LED typically has its own near field lens (NFL) to provide efficient light collection and distribution within the vehicle lighting system.

In order for the NFL to function properly, each LED must be placed at the focal point of the NFL. NFLs typically have focal points located along a single center axis, and therefore, the LED must be located along this center axis. With reference to FIGS. 1 and 2, a typical NFL 10 is illustrated. The NFL 10 is a surface of revolution, rotated about axis X. Thus, the top half 16 of the cross section of the NFL 10 is rotated about the axis X, such that the NFL is radially symmetrical about the axis X. The NFL 10 also has an optical axis that is coincident with the axis X. The optical axis X includes a focal point F of the NFL 10. Since the NFL 10 has one focal point F, it is designed for use with a single LED positioned at the focal point F. The NFL 10 itself includes a light-collecting face 11, a light-emitting face 12, and a side surface 13. The light-collecting face 11 is further comprised of an axial surface 14 surrounded by a radial surface 15.

Since a single LED typically does not provide enough light intensity in vehicle lighting applications, multiple LEDs are typically used, each having its own NFL 10. However, multiple LED and lens assemblies increase the size and complexity of the packaging of the vehicle lighting system, increasing the overall cost of the vehicle lighting system.

In view of the above, it is apparent that there exists a need for a compact lighting system that meets the intensity requirements of the automotive industry.

SUMMARY

In addressing the enumerated drawbacks and other limitations of the related art, the present invention provides a lens assembly that is compact, while providing the requisite light intensity. The lens assembly of the invention uses multiple LEDs with a single lens or NFL. To accomplish this, the lens has a plurality of focal points forming a focal ring, rather than a single focal point. Multiple LEDs or other light sources are positioned along the focal ring, providing for much brighter light intensity than would be available using a single light source.

More particularly, a lens having a main body for use with a plurality of light sources is provided. The main body of the lens is substantially radially symmetrical about an axis of revolution, which extends through a light-collecting face and a light-emitting face. The lens defines a plurality of focal points, and the focal points form a focal ring surrounding the axis.

In another aspect, the lens is incorporated into a light assembly having a plurality of light sources. Preferably, the light sources are positioned coincident with the focal ring.

Further objects, features, and advantages of this invention will become readily apparent to persons skilled in the art after a review of the following description, with reference to the drawings and claims that are appended to and form a part of this specification.

BRIEF DESCRIPTION OF THE DRAWINGS

FIG. 1 is a perspective view of a prior art lens;

FIG. 2 is a cross-sectional view of the prior art lens of FIG. 1;

FIG. 3 is a schematic partial cross-sectional view of a lens embodying the principles of the present invention;

FIG. 4 is a schematic full cross-sectional view of the lens of FIG. 3;

FIG. 5 is a perspective view of the lens of FIGS. 3-4;

DETAILED DESCRIPTION

Figure 6:
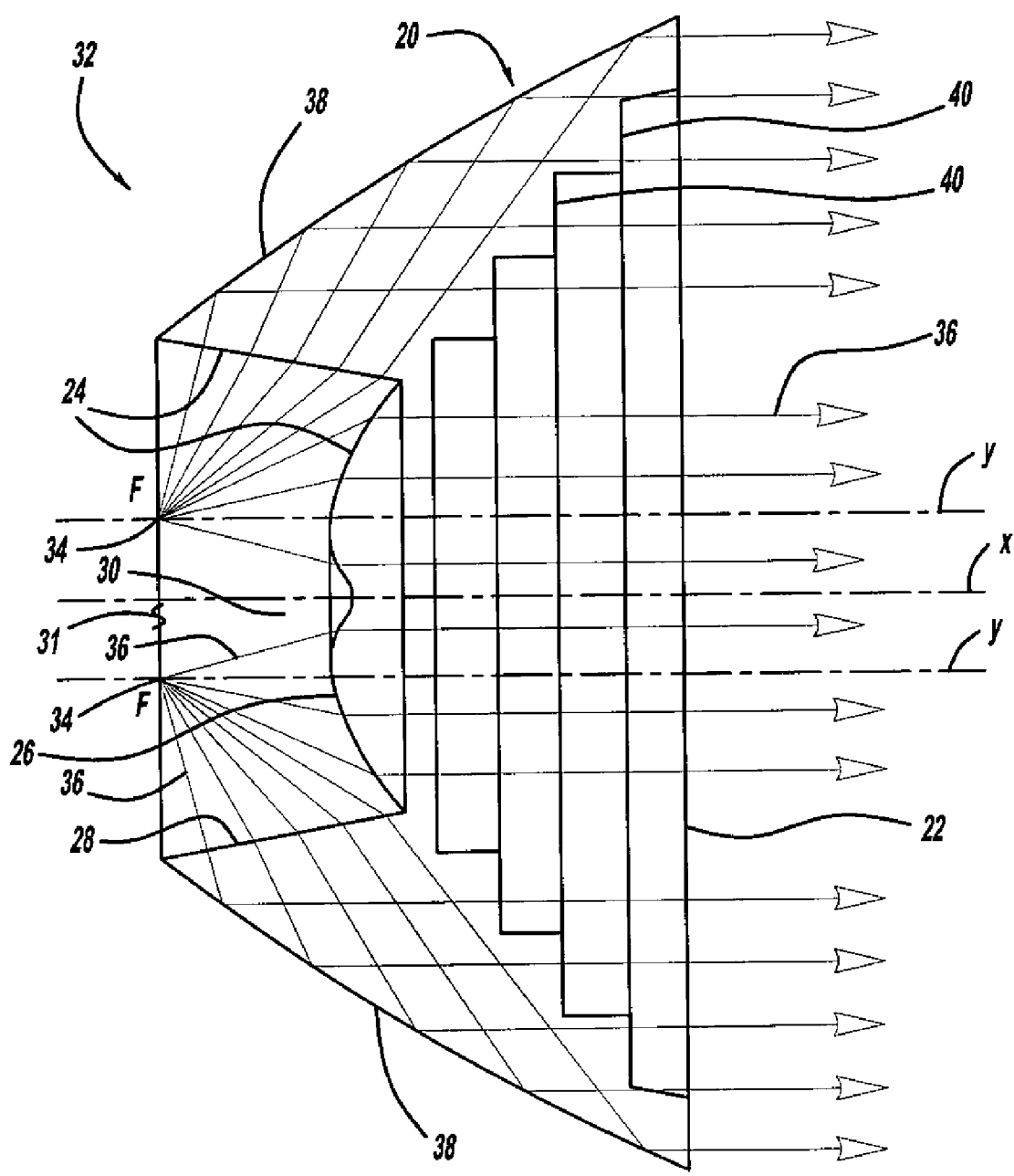
FIG. 6 is a schematic side view of the lens of FIGS. 3-5, having light rays being directed therethrough.

Referring now to FIGS. 3-5, the present invention generally provides a near field lens 20 for use with multiple light sources, preferably LEDs. Because multiple LEDs may be used with a single near field lens 20 embodying the principles of the present invention, the size and complexity of a lighting system may be reduced.

Referring to the top half 18 cross section of the lens 20 seen in FIG. 3, the lens 20 is a surface of revolution about an axis of revolution X and includes a main body 21. The main body 21 includes a light-emitting face 22 disposed opposite a light-collecting face 24. The light-collecting face 24 further has an axial surface 26 surrounded by a radial surface 28, wherein the surfaces 26, 28 define a pocket 30 in the lens 20; however, it is contemplated that the light-collecting face 24 could have other configurations without falling beyond the spirit and scope of the present invention. The axis of revolution X extends through the light-emitting face 22 and the light-collecting face 24.

The top half 18 of the cross section of the lens 20 has an optical axis Y, containing focal point F, that extends through the light-emitting face 22 and axial surface 26 of the light-collecting face 24. In the present lens 20, the focal point F is the location at which a light source can emanate light rays and the light rays will be refracted through the light-collecting face 24, reflected through the lens 20 and transmitted through the light-emitting face 22 in a substantially collimated manner. As seen in FIG. 3, the optical axis Y is not coincident with the axis of revolution X. Rather, the optical axis Y is parallel to and spaced apart, or offset, from the axis of revolution X.

When the top half 18 of the cross section of the lens 20 is rotated about the axis of a revolution X, the optical axis Y will also be rotated around the axis of revolution X and will form a cylindrical pattern of an infinite number of optical axes Y. Similarly, the focal point F will also be rotated around the axis of revolution X forming a circular pattern of an infinite number of focal points F, which is hereinafter referred to as a focal ring 31 that surrounds the axis of revolution X. Although the lens may be constructed of any suitable material, such as glass, the lens 20 is preferably constructed of an optical grade thermoplastic material.

With reference to FIG. 6, a light assembly 32 incorporating the previously described lens 20 and a plurality of light sources 34 are schematically illustrated therein. The light sources 34 are positioned adjacent to the light-collecting face 24 along the focal ring 31. For clarity purposes, two light sources 34 are shown as being located at the upper and lower focal points F in this figure. In a real world application, however, the light assembly 32 would include multiple light sources 32 at various other positions along the focal ring 31, generally in a circular pattern. The light rays 36 produced by the light sources 34 are best captured by the lens 20 when the light sources 34 are located along the optical axes Y, at the focal points F along the focal ring 31. However, it is contemplated that only a portion of the plurality of light sources 34 need be located along the focal ring 31, without falling beyond the spirit and scope of the present invention.

As noted above, some of the light rays 36 emitted from the light sources 34 are transmitted through the axial surface 26. These light rays 36 are refracted through the axially-facing surface 26 of the lens 20 in a mostly collimated manner. The light rays 36 then continue through the lens 20 and are emitted from the lens 20 by the light-emitting face 22.

Other light rays 36 emitted from the light sources 34 are transmitted through the radial surface 28. These light rays 36 are refracted through the lens 20 until they reach a side surface 38, which preferably has a free form shape formed as a smooth curve created from several parabolic segments. At least a portion of the light rays 36 hitting the side surface 38, and preferably a majority of the light rays 36 hitting the side surface 38, will be reflected by the principle of total internal reflection (TIR), as is commonly known in the art. In this embodiment the light rays 36 are reflected by the side surface 38 in a collimated manner toward the light-emitting face 22; however, it is contemplated that the side surface 38 could reflect the light rays 36 without collimating them, while still being within the spirit and scope of the present invention.

In the embodiment of FIG. 6, the light-emitting face 22 of the lens 20 has surface irregularities in the form of steps 40. Surface irregularities can be formed in the light-emitting face 22 for a variety of purposes, including ease of manufacture, savings on material costs, or altering the direction of the light rays 36 emitted from the lens 20. The configuration of the steps 40 allows material to be removed from the lens 20, making the lens 20 thinner and easier to mold, all without substantially affecting the direction of the emitted light rays 36.

Figure 7:
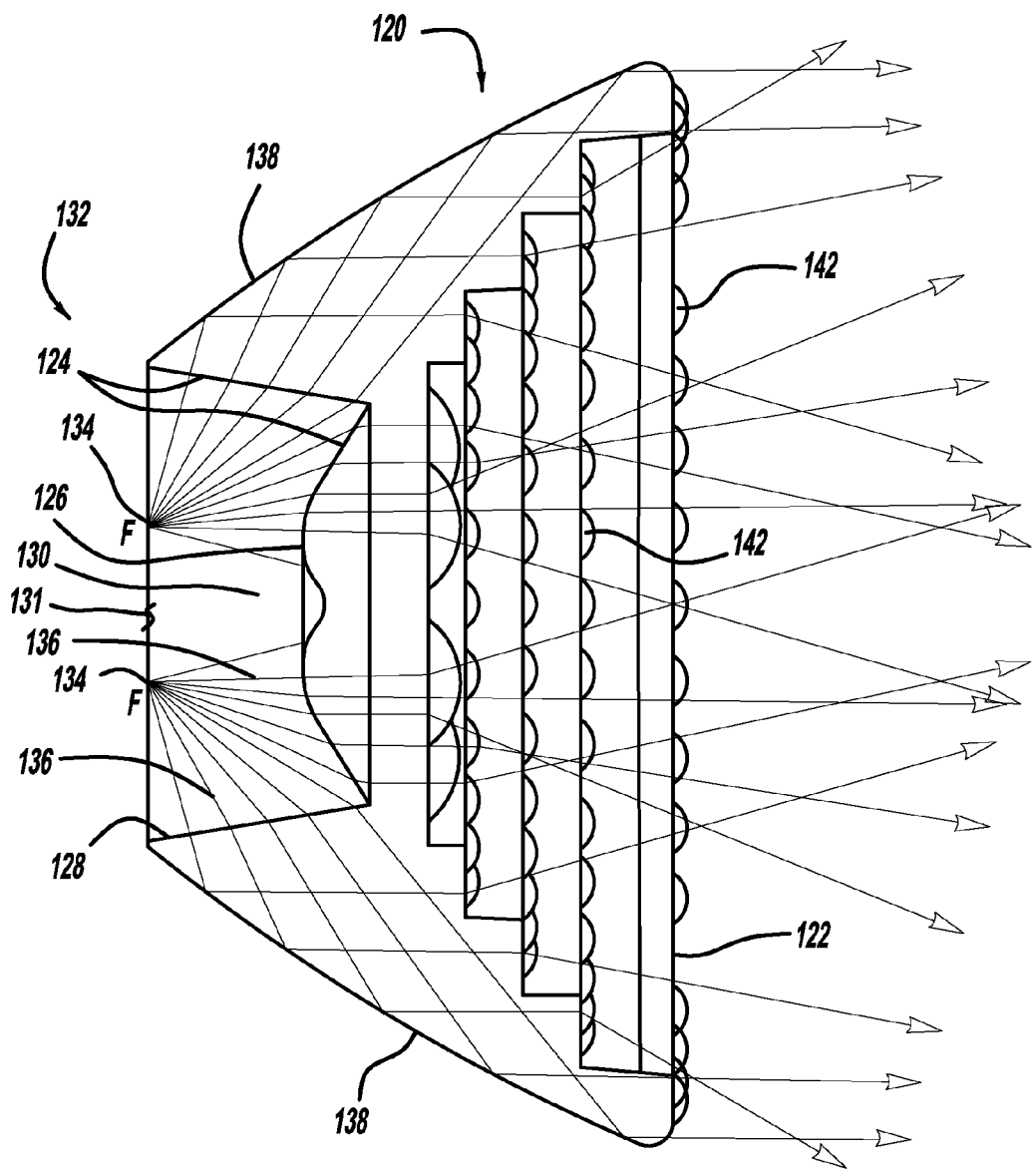
FIG. 7 is a schematic side view of another lens embodying the principles of the present invention, showing light rays being directed therethrough.

A light assembly 132, which is substantially similar to the light assembly 32 of FIG. 6, is illustrated in FIG. 7. The light assembly 132 has a lens 120 with a light-emitting face 122 disposed opposite a light-collecting face 124. The light-collecting face 124 has an axial surface 126 surrounded by a radial surface 128. Light sources 134 are positioned along the focal ring 131 at the focal points F, producing light rays 136 that are refracted and reflected by the lens 120.

In the embodiment of FIG. 7, surface irregularities in the form of surface optics 142 are included on the lens 120. The surface optics 142 may serve to change the direction of the light rays 136. For example, the surface optics 142 of FIG. 7 are circular, beam-spreading pillows. It is also contemplated that the surface optics 142 could take a variety of other forms, such as rectangular-shaped pillows, flutes, and/or prisms, without falling beyond the spirit and scope of the present invention.

Figure 8:
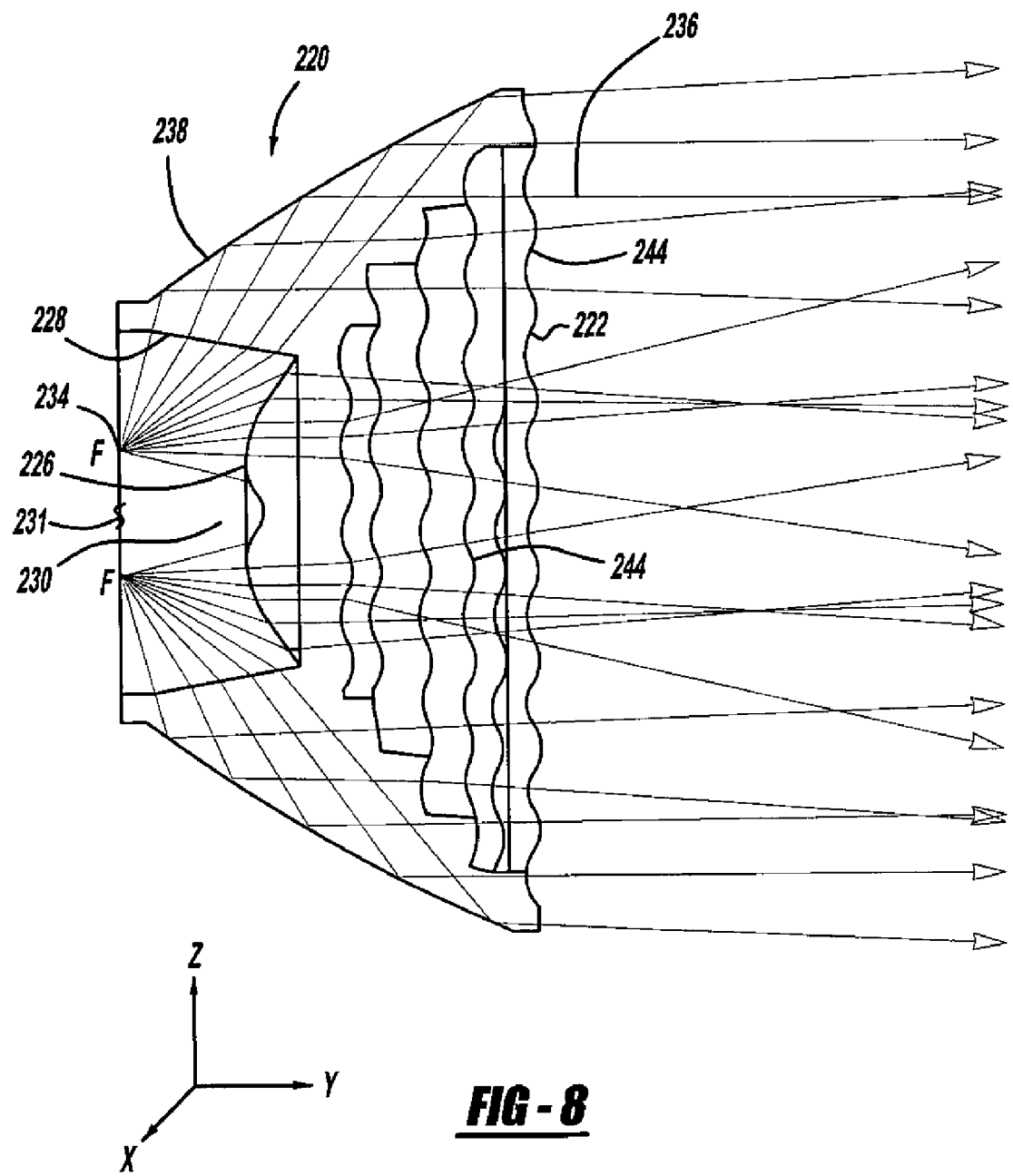
FIG. 8 is a schematic side view of yet another lens embodying the principles of the present invention, having light rays being directed therethrough.

Alternatively, with reference to FIG. 8, the surface irregularities located on the light-emitting surface 222 of the lens 220 could take the form of wave optics 244. The wave optics 244 are configured to change the direction of the light rays 236 along one plane, while refraining from changing the direction of the light rays 236 along another plane. More particularly, in this example, the light rays 236 are collimated by the axially-facing surface 226 and the side surfaces 238. With reference to the X-Y-Z coordinate system, the light-emitting surface 222 having wave optics 244 spreads the light rays 236 in the Z-direction, while collimating the light rays 236 in the X-direction (out of the page). In other words, the light rays 236 generally travel in the Y-direction, and the wave optics 244 collimate the light rays 236 in the XY plane while spreading the light rays 236 in the YZ plane.

It is also contemplated by the present invention that the wave optics 244 could be oriented horizontally to spread the light rays 236 in the X-direction, while keeping the light rays 236 collimated in the Z-direction. In other words, the wave optics could be oriented in a perpendicular direction to the wave optics 244 illustrated in FIG. 8. In such an orientation, the light rays 236 would be collimated in the YZ plane and spread in the XY plane. Likewise, the lens 220 could have both horizontal and vertical wave optics 244, spreading the light rays 236 in both the X-direction and the Z-direction. In other words, the light rays 236 would be spread in both the XY and YZ planes.

As a person skilled in the art will readily appreciate, the above description is meant as an illustration of implementation of the principles of this invention. This description is not intended to limit the scope or application of this invention in that the invention is susceptible to modification, variation, and change, without departing from the spirit of this invention, as defined in the following claims.

We claim:

1. A lens having for use with at least one light source, the main body of the lens comprising: a main body having a light-collecting face and a light-emitting face, the light-emitting face being located opposite the light-collecting face, a central axis extending through the light-collecting face and the light-emitting face with the main body being substantially radially symmetrical about the central axis, the light collecting face defining a plurality of focal points forming a focal ring that extends around the central axis of the main body.

2. The lens of claim 1, wherein the focal ring is coaxial with the central axis.

3. The lens of claim 1, further comprising portions defining a pocket in the main body, the light-collecting face being at least one surface forming the pocket, the light-collecting face having an axially-facing surface surrounded by a radially-facing surface.

4. The lens of claim 3, wherein the axially-facing surface is configured to refract a first set of light rays through the main body in a collimated manner.

5. The lens of claim 3, wherein the main body further includes a side surface, the radially-facing surface being configured to refract a second set of light rays toward the side surface, and the side surface being configured to reflect the second set of light rays toward the light-emitting face.

6. The lens of claim 5, wherein the side surface is further configured to collimate the second set of light rays.

7. The lens of claim 1, wherein the light-emitting face comprises surface irregularities.

8. The lens of claim 1, wherein the light-emitting face comprises surface optics.

9. A light assembly comprising:
a main body having a light-collecting face and a light-emitting face, the main body having a central axis extending through the light-collecting face and the light-emitting face and the main body being substantially radially symmetrical about the central axis, the light-collecting face defining a plurality of focal points forming a focal ring, the focal ring surrounding the central axis of the main body; and a plurality of light sources, at least some of the light sources being located generally coincident with the focal ring.

10. The light assembly of claim 9, wherein at each light source is positioned generally coincident with the focal ring.

11. The light assembly of claim 10, wherein a light-emitting portion of each light source of the plurality of light sources is positioned coincident with the focal ring.

12. The light assembly of claim 9, wherein the focal ring is coaxial with the central axis.

13. The light assembly of claim 9, wherein the main body further comprises portions defining a pocket therein, the pocket being defined at least in part by the light-collecting face, the light-collecting face further including an axial surface surrounded by a radial surface.

14. The light assembly of claim 13, wherein the light sources are configured to produce a first set of light rays for transmission through the axial surface and a second set of light rays for transmission through the radial surface.

15. The light assembly of claim 14, wherein the axial surface is configured to refract the first set of light rays through the main body of the lens in a collimated manner.

16. The light assembly of claim 14, wherein the main body of the lens further comprises a side surface, the radial surface is configured to refract the second set of light rays toward the side surface.

17. The light assembly of claim 16, wherein the side surface is configured to reflect the second set of light rays toward the light-emitting face in a collimated manner.

18. The light assembly of claim 9, wherein the light-emitting face of the main body of the lens includes surface irregularities.

19. The light assembly of claim 14, wherein the light-emitting face comprises surface optics, the surface optics being configured to change the direction of the first and second sets of light rays.

* * * * *

UNITED STATES PATENT AND TRADEMARK OFFICE
CERTIFICATE OF CORRECTION

PATENT NO. : 7,837,349 B2  
APPLICATION NO. : 11/763884  
DATED : November 23, 2010  
INVENTOR(S) : Chinniah et al.

Page 1 of 1

It is certified that error appears in the above-identified patent and that said Letters Patent is hereby corrected as shown below:

In The Claims

Claim 1, column 4, line 32, after "lens" delete the word "having".

Claim 10, column 5, line 6, after "wherein" delete the word "at".

Signed and Sealed this  
Twenty-fourth Day of May, 2011

David J. Kappos  
*Director of the United States Patent and Trademark Office*